US011987058B2

(12) United States Patent
Osborne et al.

(10) Patent No.: US 11,987,058 B2
(45) Date of Patent: May 21, 2024

(54) PRINT FLUID RECLAMATION

(71) Applicant: HEWLETT-PACKARD DEVELOPMENT COMPANY, L.P., Spring, TX (US)

(72) Inventors: Paul Allan Osborne, Vancouver, WA (US); John Patrick Sturman, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 110 days.

(21) Appl. No.: 17/782,906

(22) PCT Filed: Dec. 9, 2019

(86) PCT No.: PCT/US2019/065170

§ 371 (c)(1),
(2) Date: Jun. 6, 2022

(87) PCT Pub. No.: WO2021/118522

PCT Pub. Date: Jun. 17, 2021

(65) Prior Publication Data

US 2023/0347656 A1 Nov. 2, 2023

(51) Int. Cl.
*B41J 2/175* (2006.01)
*B41J 2/185* (2006.01)

(52) U.S. Cl.
CPC .......... *B41J 2/17596* (2013.01); *B41J 2/185* (2013.01)

(58) Field of Classification Search
CPC ..... B41J 2/175; B41J 2/18; B41J 2/185; B41J 2/17596; B41J 2/17566; B41J 2202/12; B41J 2/19; B41J 2/17556; B41J 2/17513; B41J 2/17553; B41J 2/17506
See application file for complete search history.

(56) References Cited

U.S. PATENT DOCUMENTS

| | | | |
|---|---|---|---|
| 6,145,958 | A | 11/2000 | Medin |
| 7,104,637 | B1 | 9/2006 | Van Steenkiste |
| 8,714,721 | B2 | 5/2014 | Frazier |
| 8,840,230 | B2 | 9/2014 | Platt et al. |
| 9,751,312 | B1 | 9/2017 | Valancy et al. |
| 2005/0151798 | A1 | 7/2005 | Merz |
| 2009/0040249 | A1 | 2/2009 | Wouters |
| 2013/0182267 | A1 | 7/2013 | Zoltner et al. |
| 2013/0321540 | A1 | 12/2013 | Platt |

*Primary Examiner* — Jannelle M Lebron
(74) *Attorney, Agent, or Firm* — Brooks, Cameron & Huebsch, PLLC

(57) ABSTRACT

In one example in accordance with the present disclosure, a method is described. According to the method, a pump is selectively activated to draw print fluid from a print fluid delivery system towards a reclamation container. It is detected when a reservoir of the print fluid delivery system is empty. In response to an indication that the reservoir is empty, the pump is selectively deactivated to terminate a print fluid reclamation process.

19 Claims, 10 Drawing Sheets

PRINT FLUID RECLAMATION

BACKGROUND

Printing systems refer to a combination of hardware components that form markings such as text, images, or other patterns on a print target. Different printing systems dispense different types of print compound on a print target surface. For example, a two-dimensional (2D) printer provides wet print compound such as ink, or dry compound such as toner, to form images/text on print media. In another example, a three-dimensional (3D) printer provides fluid, such as a fusing agent, or a dry material such as particulate build material into a bed. Over time, the print compound that is deposited on the target is depleted.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
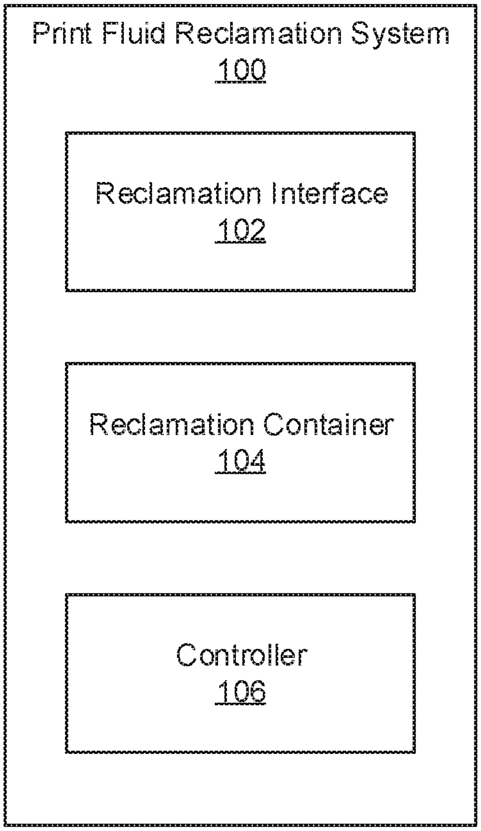
FIG. 1 is a block diagram of a print fluid reclamation system, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Printing systems in general dispense print compound onto a surface in the form of images; text, or other patterns. Different printing systems dispense different print compounds. For example, the print compound may be dry, or particle-based such as toner. In other examples, the print compound may be a liquid, such as liquid ink. Other types of compound may also be deposited on the surface via a printing system. For example, a three-dimensional printer may deposit a powder material that is to be sintered, fused, or otherwise solidified, Such a three-dimensional printer may also deposit an agent, that is dry or wet, which facilitates the solidifying of the powder material into a three-dimensional object.

In many cases, the print fluid that is used is valuable and an operator may desire to extract the print fluid from a printing system to capture that value. For example, it may be the case that a printing system is to be replaced. In this example, an operator may desire to extract the print fluid for use in the replacement, or other, printing system. In another example, a printing system may be scheduled for a repair that is best accomplished when the printing system is empty of print fluid. Again, in this case, rather than merely draining the print fluid, the operator may desire to conserve the print fluid and reclaim it for re-injection into the printing systems.

Still further, in some cases the print fluid may be hazardous to dispose of, and rather than expend the time and resources to follow proper procedures to effectuate this disposal, the operator may desire to simply capture the print fluid and avoid any disposal.

Accordingly, the present disclosure describes systems and methods for reclaiming print fluid from a printing system that is clean and automated. The reclaimed print fluid can be replaced into the printing system at a later point in time, re-used in a different printing system, or disposed of in a non-hazardous manner. In cases where the print fluid is to be disposed of, the reclamation system as described herein provides a clean and simple way to prepare the print fluid for the disposal.

Specifically, the present specification describes a print fluid reclamation system. The print fluid reclamation system includes a reclamation interface to connect with a delivery system interface of a print fluid delivery system. During printing, the delivery system interface connects the print fluid delivery system to a printhead. The print fluid reclamation system also includes a reclamation container to hold print fluid reclaimed from a reservoir of the print fluid delivery system. A controller, independent from the printer controller, of the print fluid reclamation system selectively activates a pump to draw print fluid from the print fluid delivery system towards the reclamation container.

The present specification also describes a method. According to the method, a pump on a printing system is selectively activated to draw print fluid from a print fluid delivery system on the printing system towards a reclamation container. It is detected when a reservoir of the print fluid delivery system is empty and in response to an indication that the reservoir is empty, the pump is selectively deactivated to terminate a print fluid reclamation process.

The present specification also describes a printing system. The printing system includes a print fluid delivery system to circulate print fluid throughout the printing system and a printhead to eject print fluid. The printing system includes a reclamation container selectively removable from the print fluid delivery system to reclaim print fluid from the print fluid delivery system. A reclamation interface of the printing system connects with a delivery system interface of a print fluid delivery system, A controller of the printing system selectively activates a pump in the print fluid delivery system to draw print fluid from the print fluid delivery system towards the reclamation container.

Such systems and methods 1) enable the reclamation of valuable print fluid; 2) aide in the disposal of potentially hazardous print fluid; 3) allow for print fluid to be transferred between print devices; and 4) automate and simplify the print fluid extraction.

As used in the present specification and in the appended claims, the term “fluid” refers to any fluid and contains air and print fluid. Accordingly, as used in the present specification and in the appended claims, the term "print fluid" refers to a liquid print compound that is deposited on a surface. Examples of such print fluids include liquid inks, pigments, and agents used in additive manufacturing.

Turning now to the figures, FIG. 1 is a block diagram of a print fluid reclamation system (100), according to an example of the principles described herein. As described above, for a variety of reasons, it may be desirable to extract the print fluid from a printing system. The present print fluid reclamation system (100) provides for such an operation. The print fluid reclamation system (100) includes a reclamation interface (102) to connect with a delivery system interface of a print fluid delivery system. That is, a printing system includes a print fluid delivery system that includes a reservoir for holding the print fluid and fluid delivery conduits such as tubes that deliver the print fluid to the printhead. The printhead may be selectively de-coupled to the print fluid delivery system. For example, the printing system may include a connection between the print fluid delivery system and the printhead. Such a connection includes corresponding interfaces that allow for selective and simple connecting and disconnecting of the printhead from the print fluid delivery system.

During printing, this delivery system interface connects the print fluid delivery system to a printhead. Then at different points in time, the fluidic fittings of the printhead interface can be disconnected such that the fluid delivery system and printhead are fluidly de-coupled.

The reclamation interface (102) of the print fluid reclamation system (100) couples to the printhead lines that run from the print fluid delivery system towards the printhead. In other words, printhead lines that during printing supply print fluid to the printhead, act to supply fluid to a reclamation container (104) of the print fluid reclamation system (100) during print fluid reclamation. In other words, the reclamation interface (102) may have a similar form factor as a printhead interface and may also have a form factor to mate with the delivery system interface.

While particular reference is made to a reclamation interface (102) that couples to a delivery system interface that couples the printhead to the print fluid delivery system, in some examples, the reclamation interface (102) couples to a separate interconnect that is fluidly connected to the fluid delivery system. In this example, reclamation may be executed without disconnecting the printhead lines.

The print fluid reclamation system (100) also includes a reclamation container (104) which holds print fluid reclaimed from a reservoir of the print fluid delivery system. The reclamation container (104) may take a variety of forms including an inflatable bag or a rigid container. The reclamation container (104) is fluidly coupled to the reclamation interface (102), for example via fluid lines. In some examples, the reclamation container (104) may be selectively removable from the print fluid reclamation system (100). That is, the reclamation container (104) may be removed from the rest of the print fluid reclamation system (100) when full, when print fluid reclamation is not being performed or for other reasons. In this example, the other print fluid reclamation system (100) components may be reusable with different reclamation containers (104). A controller (106) of the print fluid reclamation system (100) selectively activates a pump to draw print fluid from the print fluid delivery system towards the reclamation container (104). In some examples, the pump may be part of the print fluid delivery system. In other examples, the pump forms part of the reclamation system. That is, the pump may be formed in a housing with the reclamation container (104).

That is, the print fluid delivery system may include a pump that moves fluid through the printing system. Specifically, the pump directs fluid from the print fluid delivery system towards the printhead. The reclamation interface (102) may connect to the print fluid delivery system below this pump, such that the activation of the pump pushes fluid through the printhead lines, through the reclamation interface (102), and into the reclamation container (104).

In addition to selectively activating the pump, the controller (106) may also selectively deactivate the pump. For example, following reclamation, the controller (106) may receive an indication that the reservoir is empty. At this point in time, the controller (106) may shut off the pump so that the reclamation container (104) can be decoupled from the print fluid delivery system. In another example, the controller (106) may wait a predetermined period of time after such an indication to selectively deactivate the pump. Doing so may allow for fluid to clear out of the fluid lines that make up the print fluid delivery system.

Figure 2A:
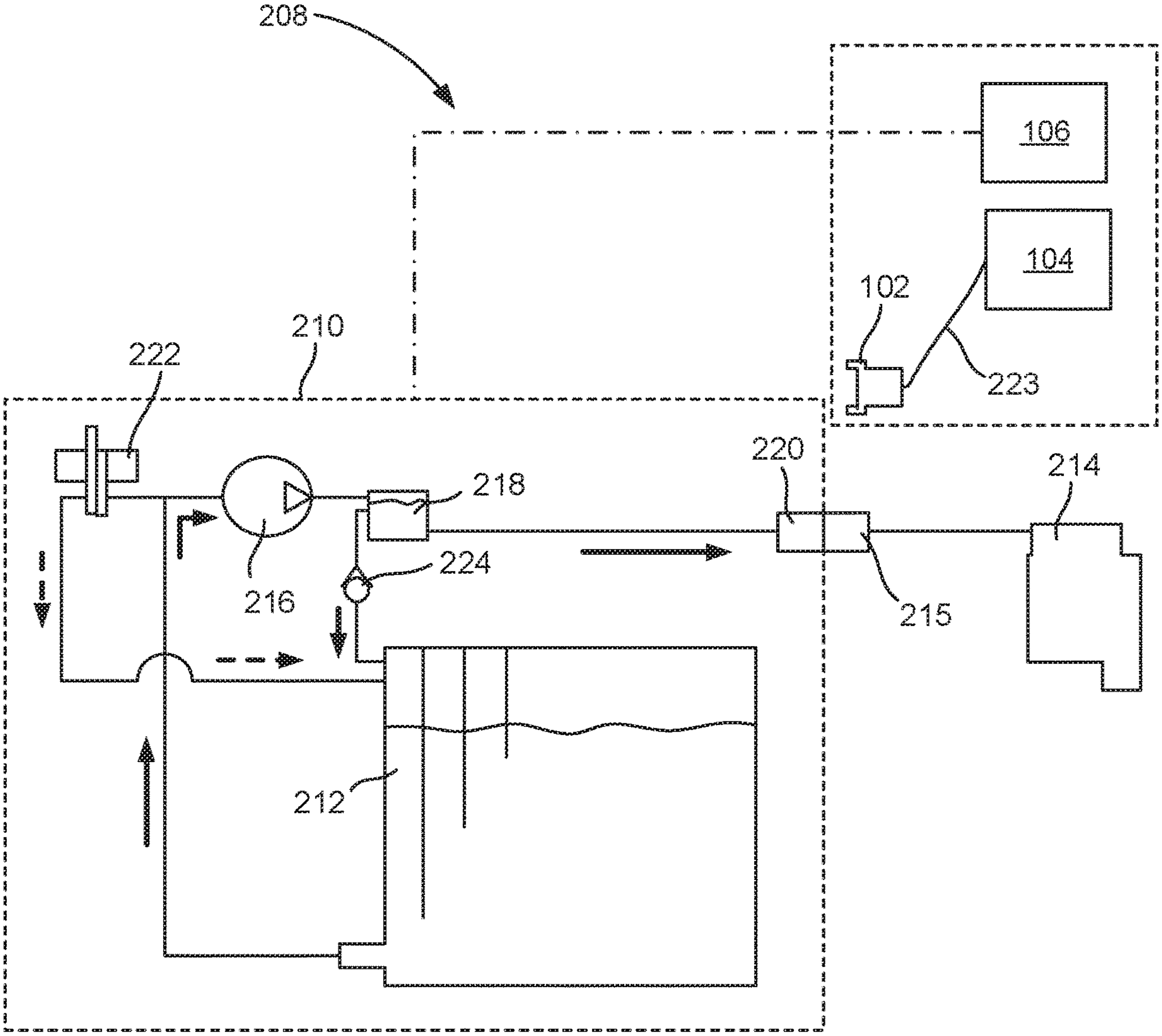
FIGS. 2A-2C are diagrams of a printing system with a print fluid reclamation system, according to an example of the principles described herein.
Figure 2B:
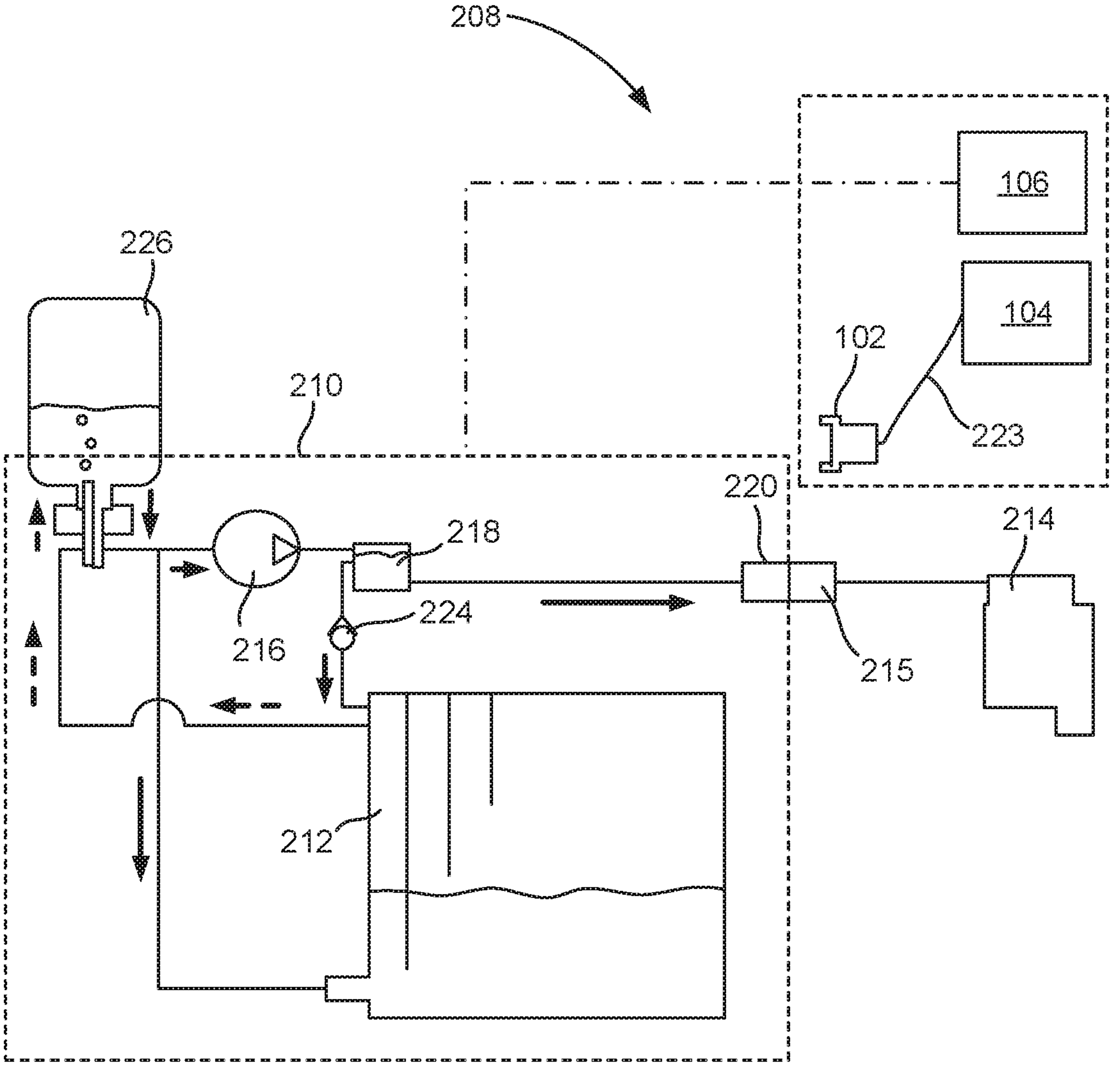
Figure 2C:
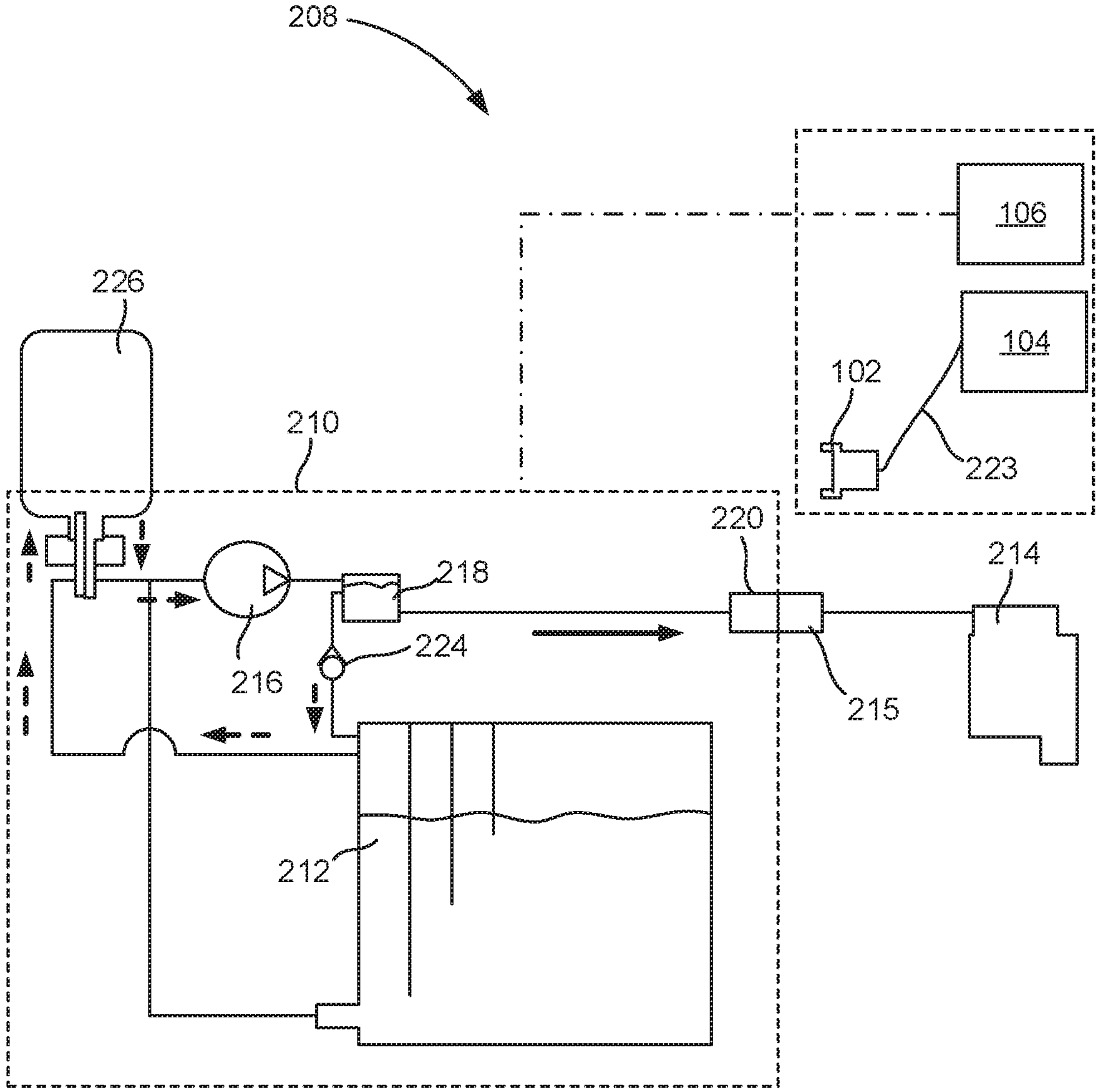

FIGS. 2A-2C are diagrams of a printing system (208) with a print fluid reclamation system (FIG. 1, 100), according to an example of the principles described herein. Specifically, FIG. 2A depicts the printing system (208) during printing and FIGS. 2B and 2C depict the printing system (208) at different stages during a reservoir (212) refill operation.

The printing system (208) includes a print fluid delivery system (210) that circulates print fluid through the printing system (208). The print fluid delivery system (210) may include various components. For example, the print fluid delivery system (210) includes a reservoir (212) to hold a volume of print fluid that is to be supplied to a printhead (214) which ejects print fluid. That is, the printhead (214) includes components that eject print fluid onto a target surface, whether that surface be a two-dimensional surface such as paper, a powder bed for additive manufacturing, or any other type of target surface. The reservoir (212) maintains a volume of the print fluid that is available to the printhead (214) for such deposition.

The print fluid that is supplied may be of a variety of types. For example, it may be a fusing agent or colored ink. In some examples, multiple print fluid delivery systems (210) may be implemented in a printing system (208). For example, a color printer may have different print fluid delivery systems (210) disposed therein, each supplying a respective printhead (214) with a different colored ink.

The printhead (214) may include any number of components to effectuate fluid ejection. For example, the printhead (214) may include a number of nozzles. A nozzle may include an ejector, a firing chamber, and an opening. The opening may allow fluid, such as ink, to be deposited onto a surface, such as a print medium. The firing chamber may include a small amount of fluid. The ejector may be a mechanism for ejecting fluid through the opening from the firing chamber, where the ejector may include a firing resistor or other thermal device, a piezoelectric element, or other mechanism for ejecting fluid from the firing chamber.

For example, the ejector may be a firing resistor. The firing resistor heats up in response to an applied voltage. As the firing resistor heats up, a portion of the fluid in the firing chamber vaporizes to form a bubble. This bubble pushes liquid fluid out the opening and onto the print medium. As the vaporized fluid bubble pops, fluid is drawn into the firing chamber and the process repeats. In this example, the printhead (214) may be a thermal inkjet (TIM printhead (214).

In another example, the ejector may be a piezoelectric device. As a voltage is applied, the piezoelectric device changes shape which generates a pressure pulse in the firing chamber that pushes a fluid out the opening and onto the print medium. In this example, the printhead (214) may be a piezoelectric inkjet (PIJ) printhead (214).

FIG. 2A also depicts the pump (216) which circulates fluid through the printing system (208). During printing, the pump (216) drives print fluid from the reservoir (212), through the reserve tank (218) to the printhead (214).

The reserve tank (218) provides print fluid to the printhead (214) during printing and during a refill operation, whether or not the refill container is empty, Specifically, the reserve tank (218) includes a printhead line port that is disposed along a bottom surface of the reserve tank (218) and fluidly connects the reserve tank (218) to the printhead (214). Whether print fluid is being supplied by the reservoir (212) during printing or whether print fluid/air is being supplied by a refill container, print fluid is passed along this printhead line port.

The printing system (208) depicted in FIG. 2A, also depicts the reclamation container (104) that is selectively removable from the print fluid delivery system (210) to reclaim print fluid from the print fluid delivery system (210). That is, as depicted in FIG. 2A, the reclamation container (104) is a remote component from the print fluid delivery system (210) and the printhead (214).

FIG. 2A also depicts the reclamation interface (102) that connects with a delivery system interface (220) of the print fluid delivery system (210). As described above, during printing, this delivery system interface (220) connects the print fluid delivery system (210) to the printhead (214), The delivery system interface (220) mates with a printhead interface (215) fluidly coupled to the printhead (214). During reclamation, the printhead interface (215) is disconnected and the delivery system interface (220) connects the print fluid delivery system (210) to the reclamation container (104). FIG. 2A also depicts fluid lines (223) that may couple the reclamation interface (102) to the reclamation container (104).

FIG. 2A also depicts the controller (106) that selectively activates the pump (216). Note that in FIG. 2A, the dashed-dot line indicates a data connection between the controller (106) and the print fluid delivery system (210) to facilitate print fluid reclamation. Such data connection may include data from components of the print fluid delivery system (210) to the controller (106) and control signals from the controller (106) to components of the print fluid delivery system (210).

As described above, FIG. 2A depicts a printing system (208) during printing. An example of the operation of the different components during printing is now presented. In FIG. 2A, print fluid flow is indicated by solid arrows whereas air flow is indicated by dashed arrows. In this example, the pump (216) draws print fluid from the reservoir (212) into the reserve tank (218). Via capillary action and the action of the pump (216), print fluid is drawn through the delivery system interface (220) towards the printhead (214) to be used in printing.

During printing, a refill port (222) which receives a refill container is closed, preventing any flow through it. In some examples, the refill port (222) includes a vent. As the printhead (214) operation causes the level of the print fluid in the reservoir (212) to drop, this vent allows air to flow in to the reservoir (212) to maintain near atmospheric pressure in the reservoir (212).

In some examples, the print fluid delivery system (210) includes a pressure control device (224) to regulate pressure in the print fluid delivery system (210). This pressure control device (224) may be disposed along the return line between the reserve tank (218) and the reservoir (212). In some examples, the pressure control device (224) may be a ball on a seat with a spring behind it. As fluid pushes harder against the ball, the spring compresses and fluid can pass into the reservoir (212). Such a pressure control device (224) ensures a constant pressure in the reserve tank (218) and thereby a constant pressure differential which transports the print fluid to the printhead (214).

FIG. 2B depicts refilling the reservoir (212) when the refill container (226) contains print fluid. As described above, to refill the reservoir (212), a refill container (226) is inserted into the refill port (FIG. 2A, 222). During a refill operation, print fluid is drawn, via action of the pump (216), from the refill container (226), through the reserve tank (218) and to the reservoir (212). Specifically, during reservoir (212) fill, the fill port (FIG. 2A, 222) is uncapped and the refill container (226) is attached thereto.

The fluid in the reserve tank (218) flows through two outputs. First, fluid near the bottom passes to the printhead (214). When the fluid gets to a certain height, it returns to the reservoir (212) through a return line, That is, during refilling, the reserve tank (218) provides printing fluid to the printhead (214) and refills the reservoir (212) all while preventing air from entering the printhead (214). That is, any print fluid makes its way to the bottom of the reserve tank (218) and is passed to the printhead (214) while air above the print fluid is passed to the reservoir (212) through the return line.

FIG. 2C is a diagram of a printing system (208) during refilling when a refill container (226) is empty, That is, at the point depicted in FIG. 2C, all print fluid may have been drained from the refill container (226) before the reservoir (212) is filled. As there may not be a way to detect when a refill container (226) is empty, the pump (216) may continue to operate. However, as there is no print fluid in the refill container (226) air, rather than print fluid, is pumped into the reserve tank (218). If air is allowed into the printhead (214), damage to printhead (214) components and/or reduced print quality may result. The form of the reserve tank (218) prevents this. For example, even while air is being pumped into the reserve tank (218), print fluid may still reside in the bottom of the reserve tank (218). This print fluid is drawn into the printhead (214). The air, by comparison, being above the print fluid is not in contact with the printhead line. Rather, the air is passed through the return line into the reservoir (212) where it can be cycled back to the refill container (226).

Figure 3:
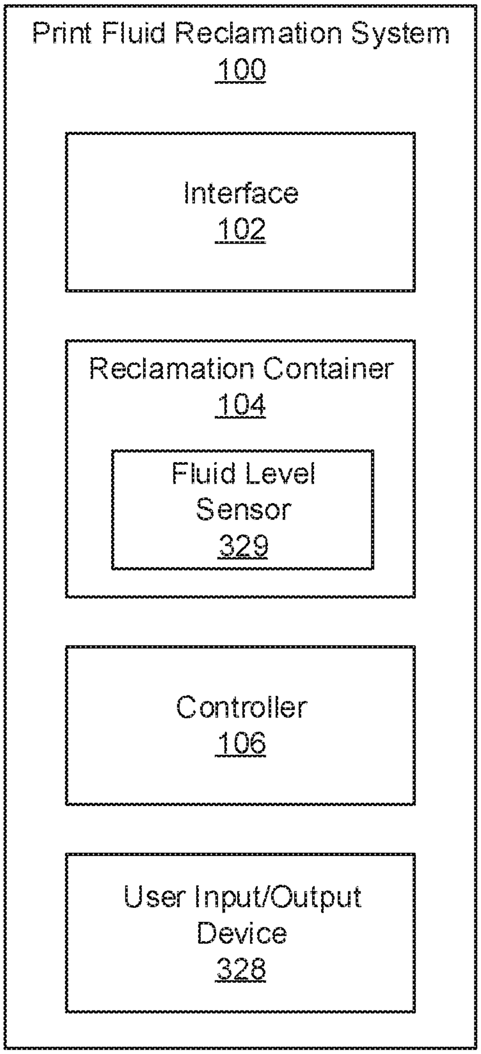
FIG. 3 is a block diagram of a print fluid reclamation system, according to another example of the principles described herein.

FIG. 3 is a block diagram of a print fluid reclamation system (100), according to another example of the principles described herein. In this example, the print fluid reclamation system (100) includes the reclamation interface (102), reclamation container (104), and controller (106) as described above. In this example, the print fluid reclamation system (100) includes additional components. For example, the print fluid reclamation system (100) may include a user input/output device (328) to manage print fluid reclamation. In general, the user input/output device (328) allows the user control over the print fluid reclamation process and provides information, notifications, etc. to the user.

For example, the print fluid reclamation process includes a number of operations, each of which may be authorized by a user. For example, the user input/output device (328) may allow an operator to instruct the controller (106) to selectively activate/deactivate the pump (FIG. 2A, 216).

The user input/output device (328) may also allow control over various characteristics of the print fluid reclamation process. For example, pump (FIG. 2A, 216) speed and/or strength may be adjusted via the user input/output device (328). That is, the user input/output device (328) allows a user to manipulate the print fluid reclamation process to best suit the circumstances.

The user input/output device (328) may include an interface to output information. For example, characteristics and metrics of the print fluid reclamation process may be communicated to the user via the user input/output device (328). Examples of such metrics include amount of print fluid remaining in the reservoir (FIG. 2A, 212), pressure within the print fluid delivery system (FIG. 2A, 210), etc.

The user input/output device (328) may also provide alerts. For example, visual and/or audible alerts may be made to alert the user of certain circumstances. For example, an audible alert could be made indicating that the print fluid level in the reservoir is below a threshold value or that one of the components involved in the print fluid reclamation process has malfunctioned. The user input/output device (328) may take a variety of forms including a keypad, display screen, touch screen, or combinations thereof.

In some examples, the controller (106) may be disposed 1) on the printing system (FIG. 2A, 208), 2) on a remote device along with the reclamation container (104), 3) on a remote device that is separate from the reclamation container (104), or may include controllers performing particular operations on different devices. In these examples, the user input/output device (328) may be on the same device or a separate device from the controller (106).

In some examples, a fluid level sensor (329) may be disposed inside of the reclamation container (104). This may prevent overfilling of the reclamation container (104). For example, it may be the case that the reclamation container (104) is smaller than the reservoir (FIG. 2A, 212) or that the reclamation container (104) may be used for reclaiming print fluid from multiple reservoirs (FIG. 2A, 212). Accordingly, the fluid level sensor (329) would allow for effective filling of the reclamation container (104) while preventing overfilling. Accordingly, the fluid level sensor (329) may be coupled to the user input/output device (328) to present an alert and/or notification of the reclamation container (104) fill level.

Figure 4:
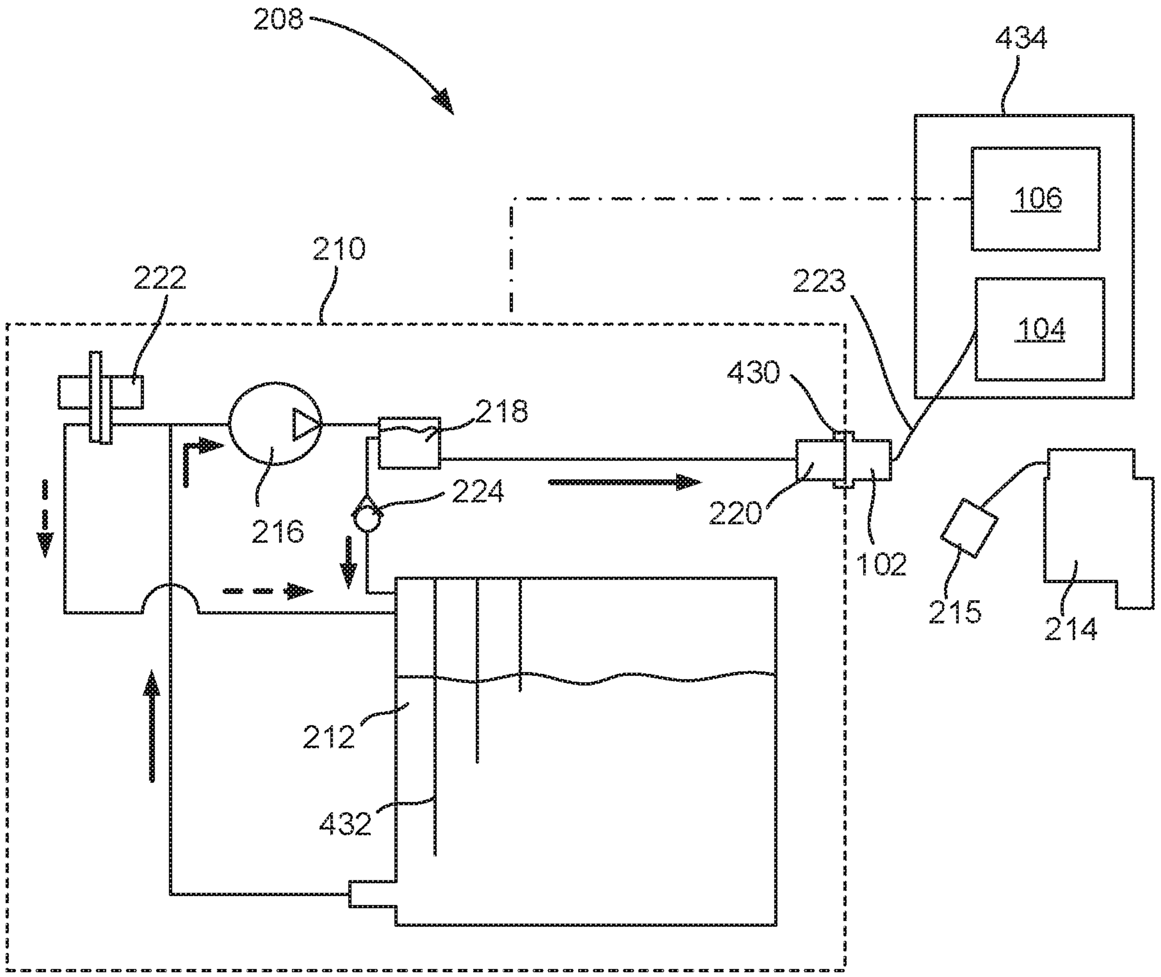
FIG. 4 is a diagram of a printing system during print fluid reclamation, according to an example of the principles described herein.

FIG. 4 is a diagram of a printing system (208) during print fluid reclamation, according to an example of the principles described herein. As an initial operation, the pump (216) may be deactivated and the printhead interface (215) disconnected from the delivery system interface (220) such that the reclamation interface (102) of the print fluid reclamation system (100) can be coupled to the printhead lines. In some examples, the reclamation interface (102) may include a latch (430) to retain the reclamation container (104) coupled to the print fluid delivery system (210). Such a latch (430) may include a mechanical hook that mates with a corresponding protrusion. In another example, the latch (430) may be a magnetic latch. While particular reference is made to particular types of latches (430), a variety of latch types may be implemented in accordance with the principles described herein.

In addition to being fluidly coupled, the print fluid reclamation system (100) and print fluid delivery system (210) may be electrically coupled to one another. This may be through the reclamation interface (102)/delivery system interface (220) connection or may be a different connection between the print fluid reclamation system (100) and a control system for the print fluid delivery system (210). That is, there may be a single connection between the print fluid reclamation system (100) and the print fluid delivery system (210) that provides both fluid and electrical connection. In other examples, there may be a separate connection for each of a fluid connection and an electrical connection.

In some examples, the presence of a fluid connection may be verified. That is, the print fluid delivery system (210) or the print fluid reclamation system (100) may include an electronic sensor that detects when the two are properly coupled to one another. In various examples, other types of sensors or valves actuated in response to proper coupling may be used to detect or verify proper coupling. In some examples, without such a verification, the activation of the pump (216) is prohibited so as to prevent spillage of the print fluid during the reclamation operation.

Following coupling, the controller (106) may selectively activate the pump (216) to begin drawing fluid from the reservoir (212), through the reserve tank (218), along the printhead lines, and ultimately into the reclamation container (104).

In some examples, the reclamation operation may be based on output from additional sensors in the print fluid delivery system (210). For example, the print fluid delivery system (210) may include fluid level sensors (432) disposed within the reservoir (212) that detect the amount of fluid left in the reservoir (212). The output of these sensors (432) may be passed to the user input/output device (FIG. 3, 328) display screen and presented to the user. In some examples, the user can be prompted to stop the reclamation operation. In other examples, the output of these sensors (432) may be used to automatically deactivate the pump (216). For example, the controller (106) may be electrically coupled to the sensors (432) such that the fluid level in the reservoir (212) is passed to the controller (106) and when the fluid level is below a threshold amount, the controller (106) may selectively deactivate the pump (216) or may deactivate the pump (216) a predetermined amount of time after an indication of an empty reservoir (212), which predetermined period of time allows for the supply lines in the print fluid delivery system (210) to be flushed.

In some examples, the pressure control device (224) pressurizes the reserve tank (218) so that print fluid is pushed towards the reclamation container (104). That is, the pump (216) and the pressure control device (224) work together to move the print fluid into the reclamation container (104) rather than back to the reservoir (212).

As depicted in FIG. 4, in some examples, the reclamation container (104) is on a remote component and separable from the print fluid delivery system (210) and a printer of the printing system such that the reclamation container (104) can be transported with its print fluid load. In some examples, the remote component (434) includes a computing device which includes the controller (106). That is, the reclamation container (104) and the controller (106) are both distinct components from the print fluid delivery system (210) and in some cases may be on the same remote component (434). That is, the reclamation container (104) may have a housing that includes the user input/output device (FIG. 3, 328) and the controller (106).

In another example, the reclamation container (104) may be one component that is fluidly connected to the print fluid delivery system (210) via the reclamation interface (102) and the user input/output device (FIG. 3, 328) and controller (106) are on a distinct computing device that is separate from the reclamation container (104) and that is electrically coupled to the print fluid delivery system (210).

Figure 5:
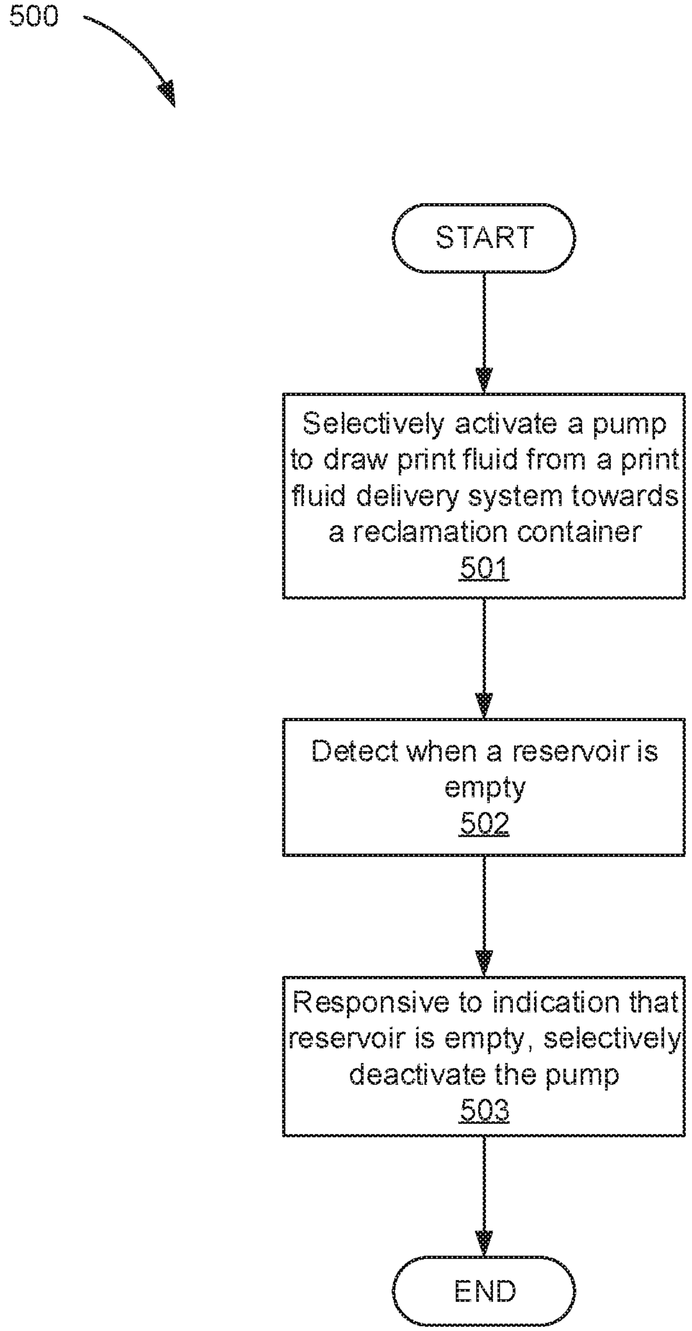
FIG. 5 is a flow diagram of a method of reclaiming print fluid, according to an example of the principles described herein.

FIG. 5 is a flow diagram of a method (500) of reclaiming print fluid, according to an example of the principles described herein. As described above, once the print fluid reclamation system (FIG. 1, 100) is coupled to the print fluid delivery system (FIG. 2A, 210), the controller (FIG. 1, 106) selectively activates (block 501) a pump (FIG. 2A, 216) to draw print fluid from the print fluid delivery system (FIG. 2A, 210) on the printing system (FIG. 2A, 208) to the reclamation container (FIG. 1, 104). As described above, in some examples, such selective activation (block 501) may be dependent upon a verification that the reclamation interface (FIG. 1, 102) is properly coupled to the delivery system interface (FIG. 2A, 220).

Throughout the reclamation process, the fluid level in the reservoir (FIG. 2A, 212) may be monitored, for example via outputs of fluid level sensors (FIG. 4, 432) to the controller (FIG. 1, 106). These sensors (FIG. 4, 432) detect (block 502) when a reservoir (FIG. 2A, 212) of the print fluid delivery system (FIG. 2A, 210) is empty. Responsive to such an indication, the controller (FIG. 1, 106) selectively deactivates (block 503) the pump (FIG. 2A, 216) to terminate the print fluid reclamation process. In other words, the present method (500) allows the print fluid reclamation system (FIG. 1, 100) control over components of the print fluid delivery system (FIG. 2A, 210), specifically the pump (FIG. 2A, 216), to draw fluid out of the reservoir (FIG. 2A, 212) and other components of the print fluid delivery system (FIG. 2A, 210), such that the print fluid may be recycled or properly disposed of.

Figure 6:
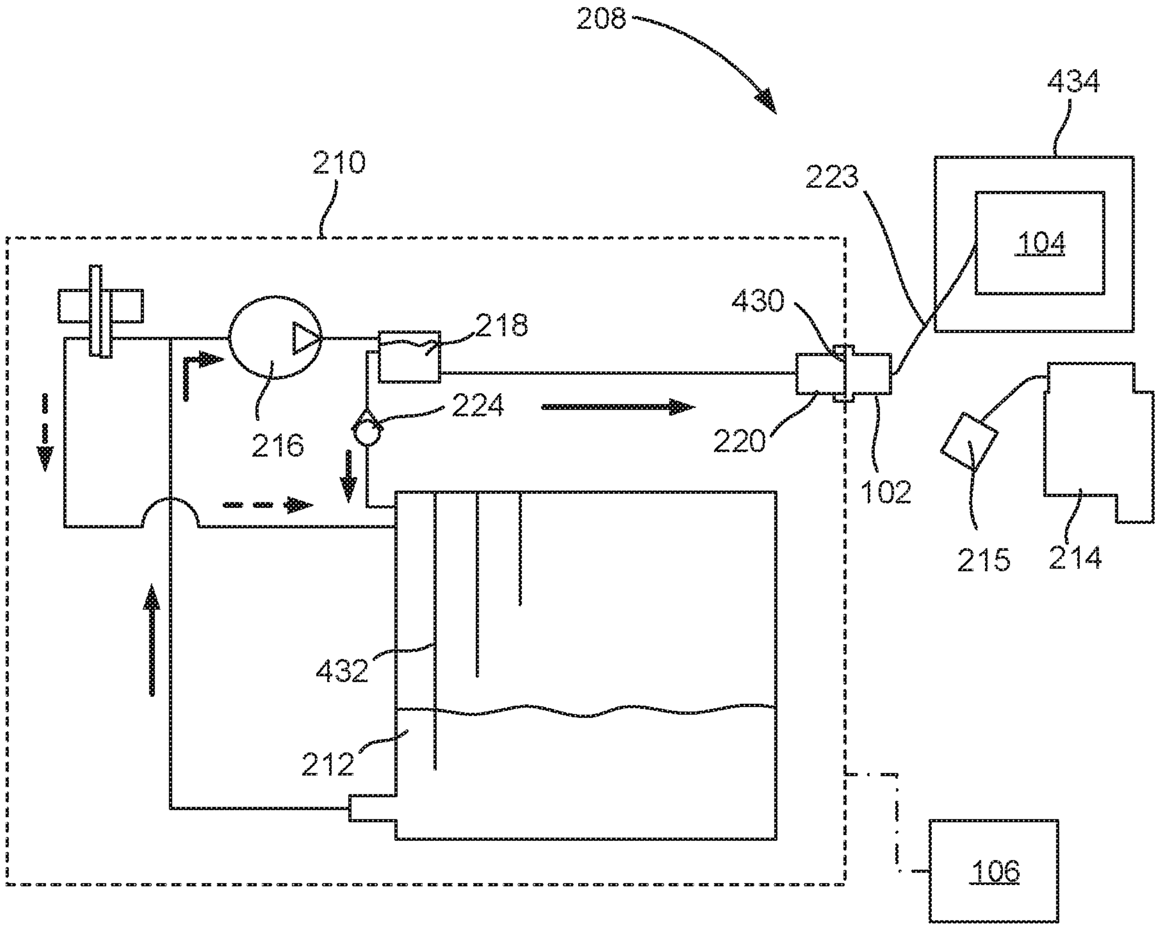
FIG. 6 is a diagram of a printing system during print fluid reclamation, according to another example of the principles described herein.

FIG. 6 is a diagram of a printing system (208) during print fluid reclamation, according to another example of the principles described herein. FIG. 6 depicts an example where the reclamation container (104) is disposed on the remote component (434), but the controller (106) and in some examples the user input/output device (FIG. 3, 328) are formed on the printing system (208) that includes the print fluid delivery system (210) and the printhead (214). In this example, the user input/output device (FIG. 3, 328) may be an existing interface on the printing system (208) and a maintenance interface is presented to control the print fluid reclamation process.

Figure 7:
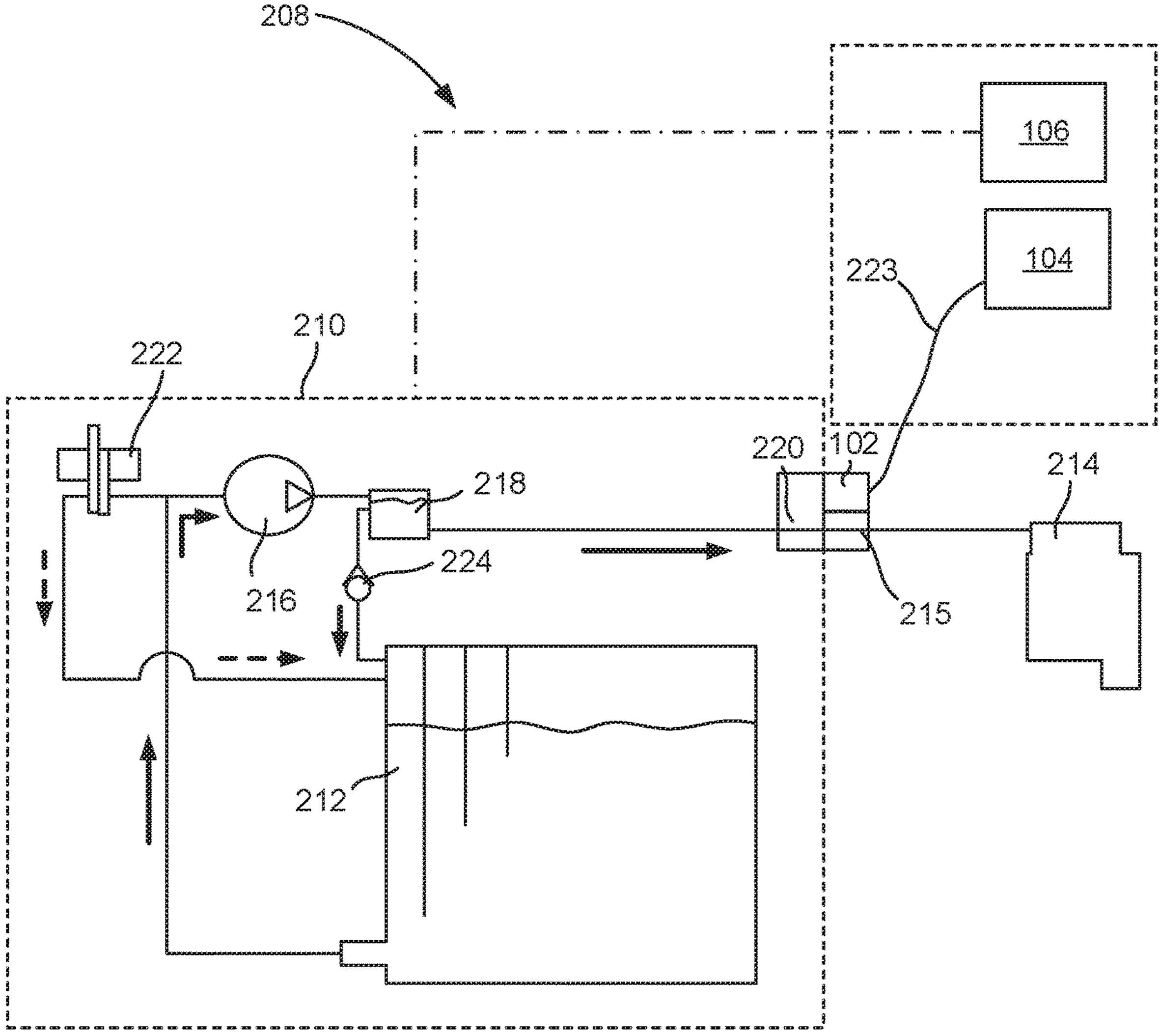
FIG. 7 is a diagram of a printing system with a print fluid reclamation system, according to another example of the principles described herein.

That is, the printing system (208) may be a single physical structure that includes the printhead (214), print fluid delivery system (210) and other components to effectuate printing. In this example, the remote component (434) with the reclamation container (104) may be a passive where the active control over print fluid reclamation comes from the printing system (208) interface. In this example, fluid reclamation may be similar to as described above in connection with FIG. 4, save that the notifications, updates, and control is done at the printing system (208) itself, FIG. 7 is a diagram of a printing system 208) with a print fluid reclamation system, according to another example of the principles described herein. In the example depicted in FIG. 7, the delivery system interface (220) is sized to be simultaneously coupled to both the reclamation interface (223) and the printhead interface (215). In this example, the delivery system interface (200) may include a selector or valve, which may be electrical or mechanical, that switches to which output the print fluid is to flow. For example, during reclamation, print fluid may be directed to the reclamation container (104) whereas during printing, fluid may be directed to the printhead (214).

Figure 8:
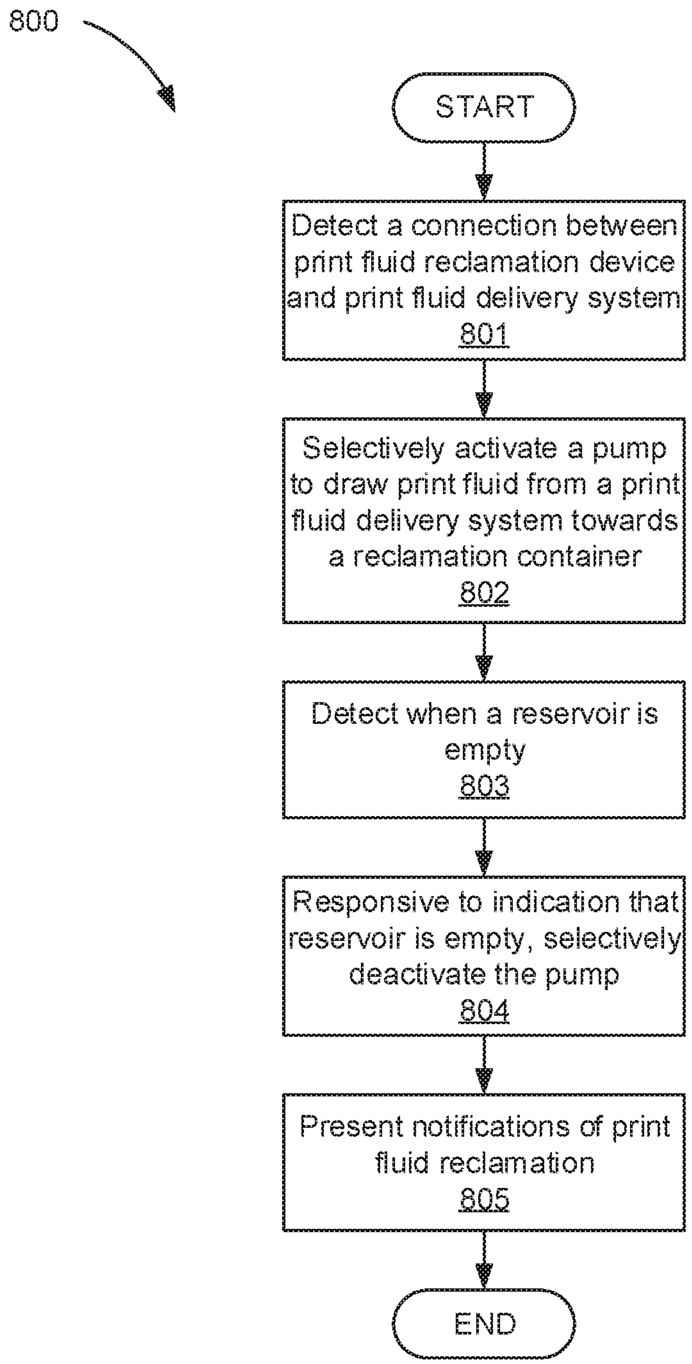
FIG. 8 is a flow diagram of a method of reclaiming print fluid, according to another example of the principles described herein.

FIG. 8 is a flow diagram of a method (800) of reclaiming print fluid, according to another example of the principles described herein, According to the method (800), a connection between the print fluid reclamation system (FIG. 1, 100) and the print fluid delivery system (FIG. 2A, 210) is detected (block 801). That is, as described above, either the reclamation interface (FIG. 1, 102) or the delivery system interface (FIG. 2A, 220) may include a mechanical or electrical sensor to determine when the reclamation interface (FIG. 1, 102) is properly seated/mated with the delivery system interface (FIG. 2A, 220). Such a detection (block 801) and verification ensures that print fluid will travel as intended through the reclamation interface (FIG. 1, 102) without the print fluid spilling.

Once such a connection is detected (block 801), the controller (FIG. 1, 106) may selectively activate (block 802) the pump (FIG. 2A, 216) to capture print fluid in the reclamation container (FIG. 1, 104). This may be done as described above in connection with FIG. 5.

The controller (FIG. 1, 106) may detect (block 803) when a reservoir (FIG. 2A, 212) is empty and responsive to this detection selectively deactivates (block 804) the pump (FIG. 2A, 216). These operations may be performed as described above in connection with FIG. 5.

In some examples, notifications of the print fluid reclamation process are presented (block 805) to a user. The type of notification may vary. For example, the notification may indicate a current fluid level in the reservoir (FIG. 2A, 212) and/or a pump (FIG. 2A, 216) speed. In some examples, the notifications may include alerts, such as an alert that the reservoir (FIG. 2A, 212) is nearing empty and/or that the reclamation container (FIG. 1, 104) is nearly full. While particular reference is made to specific notifications, a variety of notifications may be presented (block 805) to the user.

Such systems and methods 1) enable the reclamation of valuable print fluid; 2) aides in the disposal of potentially hazardous print fluid; 3) allow for print fluid to be transferred between print devices; and 4) automate and simplify the print fluid extraction.

What is claimed is:

1. A print fluid reclamation system, comprising:

a reclamation interface to connect a reclamation container with a delivery system interface of a print fluid delivery system;

the delivery system interface to alternatively connect a reservoir of the print fluid delivery system to:

a printhead of the print fluid delivery system, while the printhead is in a print mode; and the reclamation container for a print fluid reclamation while in a reclamation operation;

the reclamation container to hold print fluid reclaimed from the reservoir of the print fluid delivery system; and a controller to selectively activate a pump to draw print fluid from the print fluid delivery system to the reclamation container.

2. The print fluid reclamation system of claim 1, wherein the reclamation interface is to connect to printhead lines that run from the print fluid delivery system towards the printhead.

3. The print fluid reclamation system of claim 1, further comprising a user input/output device to manage print fluid reclamation.

4. The print fluid reclamation system of claim 1, wherein the print fluid delivery system comprises a pressure control device to pressurize a reserve tank to push print fluid into the reclamation container.

5. The print fluid reclamation system of claim 1, further comprising a fluid level sensor disposed within the reclamation container.

6. The print fluid reclamation system of claim 1, wherein the controller is to selectively deactivate the pump responsive to an indication that the reservoir of the print fluid delivery system is empty.

7. The print fluid reclamation system of claim 1, wherein the reclamation container is selectively removable from the print fluid reclamation system.

8. The print fluid reclamation system of claim 1, wherein the reclamation container is a separate component from the print fluid delivery system and a printer of the print fluid reclamation system.

9. The print fluid reclamation system of claim 8, wherein:
the separate component comprises a computing device; and
the computing device comprises the controller.

10. The print fluid reclamation system of claim 1, wherein the delivery system interface is sized to be simultaneously coupled to the reclamation interface and a printhead interface and the print fluid reclamation system further comprises a selector to switch a direction of print fluid flow between the reclamation container and the printhead.

11. The print fluid reclamation system of claim 1, wherein the reclamation interface includes a latch to retain the reclamation container coupled to the print fluid delivery system.

12. A method, comprising:
selectively activating a pump to draw print fluid from a reservoir of a print fluid delivery system to a reclamation container via a delivery system interface, wherein the delivery system interface alternatively connects the reservoir of the print fluid delivery system to:
a printhead of the print fluid delivery system while the printhead is in a print mode; and
a reclamation interface connected to the reclamation container for a print fluid reclamation process;
detecting when the reservoir of the print fluid delivery system is empty; and
in response to an indication that the reservoir is empty, selectively deactivating the pump to terminate the print fluid reclamation process.

13. The method of claim 12, further comprising displaying notifications of the print fluid reclamation process.

14. The method of claim 12, further comprising detecting a connection between the reclamation container and the print fluid delivery system.

15. A device, comprising:
a print fluid delivery system to circulate print fluid throughout a printing system, the print fluid delivery system having a reservoir, a printhead, and a delivery system interface to alternatively connect the reservoir of the print fluid delivery system to:
the printhead of the print fluid delivery system; and
a reclamation container for holding print fluid reclaimed from the reservoir of the print fluid delivery system, wherein:
the reclamation container is selectively removable from the print fluid delivery system; and
the reclamation container includes a reclamation interface to connect the reclamation container with and selectively remove the reclamation container from the delivery system interface of the print fluid delivery system;
a pump of the print fluid delivery system coupled to the reservoir; and
a controller to selectively activate the pump of the print fluid delivery system to draw print fluid from the reservoir of the print fluid delivery system to the reclamation container.

16. The device of claim 15, wherein the controller selective deactivates the pump, during refill, when a refill container is full or a reservoir of the print fluid delivery system is empty.

17. The device of claim 15, further comprising a selector to switch a direction of print fluid flow between the reclamation container and the printhead, wherein the delivery system interface is to simultaneously couple to both the reclamation interface and a printhead interface.

18. The device of claim 15, further comprising a printhead interface to couple the printhead to the delivery system interface, wherein while the reclamation interface is connected to the delivery system interface for a print fluid reclamation the printhead interface is de-coupled from the print fluid delivery system.

19. The device of claim 15, wherein the reservoir of the print fluid delivery system is connected to the printhead while the printhead is in a print mode and to the reclamation container during a print fluid reclamation.

* * * * *